Aug. 29, 1944.  E. WILDHABER  2,357,153
METHOD OF CUTTING GEARS
Original Filed Dec. 22, 1937    6 Sheets-Sheet 1

INVENTOR
ERNEST WILDHABER
ATTORNEY

Aug. 29, 1944.    E. WILDHABER    2,357,153
METHOD OF CUTTING GEARS
Original Filed Dec. 22, 1937    6 Sheets-Sheet 2

INVENTOR
ERNEST WILDHABER
ATTORNEY

Aug. 29, 1944.   E. WILDHABER   2,357,153
METHOD OF CUTTING GEARS
Original Filed Dec. 22, 1937   6 Sheets-Sheet 3

INVENTOR
ERNEST WILDHABER
ATTORNEY

Aug. 29, 1944.     E. WILDHABER     2,357,153
METHOD OF CUTTING GEARS
Original Filed Dec. 22, 1937    6 Sheets-Sheet 4

INVENTOR
ERNEST WILDHABER
ATTORNEY

Aug. 29, 1944.    E. WILDHABER    2,357,153
METHOD OF CUTTING GEARS
Original Filed Dec. 22, 1937    6 Sheets-Sheet 5

INVENTOR
ERNEST WILDHABER
*B. Schlesinger*
ATTORNEY

Aug. 29, 1944.   E. WILDHABER   2,357,153
METHOD OF CUTTING GEARS
Original Filed Dec. 22, 1937   6 Sheets-Sheet 6

INVENTOR
ERNEST WILDHABER
ATTORNEY

Patented Aug. 29, 1944

2,357,153

UNITED STATES PATENT OFFICE 2,357,153

METHOD OF CUTTING GEARS

Ernest Wildhaber, Brighton, N. Y., assignor to Gleason Works, Rochester, N. Y., a corporation of New York Original application December 22, 1937, Serial No. 181,177, now Patent No. 2,267,181, dated December 23, 1941. Divided and this application October 9, 1940, Serial No. 360,437

37 Claims. (Cl. 90—9)

The present invention relates to the manufacture of gears and particularly to the manufacture of straight tooth bevel gears. Broadly considered the invention comprises a new form of gearing, a novel method of manufacturing gears, and a new and improved form of gear cutting tool. The present application covers the new method and is a division of my copending application, Serial No. 181,177, filed December 22, 1937, now Patent No. 2,267,181, granted December 23, 1941.

In general, the method of the present invention is an improvement over the method of cutting gears described in my earlier co-pending application No. 164,340, filed September 17, 1937, now Patent No. 2,315,147, granted March 30, 1943. In my earlier application a method of cutting straight bevel gears is disclosed in which a disc-type gear cutter is employed and tooth spaces of the gear are cut by rotating this cutter in engagement with a tapered gear blank while holding the blank stationary on its axis and while producing a relative feed movement between cutter and blank longitudinally of a tooth space of the blank in time with the cutter rotation. The blades of this cutter are preferably made of circular arcuate curvature, and successive blades have progressively varying radii of curvature to cut teeth which will vary in shape from end to end in accordance with the lengthwise taper desired in the teeth of a bevel gear.

With the method of this earlier application, it is possible to successively rough and finish-cut a tooth space of a bevel gear on each revolution of a cutter. Thus a cutter may be used that has a plurality of roughing blades followed by a plurality of finishing blades with a gap between the last finishing blade and the first roughing blade. With such a cutter, a tooth space may be roughened during feed of the cutter in one direction across the face of a gear blank and this same tooth space may be finished during the return feed motion of the cutter, and the blank may be indexed when the gap in the cutter is abreast of the blank.

The method of cutting bevel gears disclosed in my prior application No. 164,340 is, therefore, very fast. The cutter used, however, is difficult and expensive to manufacture, since each finishing blade is made to a different profile shape to cut at a different point along the length of a gear tooth. Moreover, the method is strictly a high production process since the cutter is made primarily to cut a given gear only.

A primary object of the present invention is to provide a method of manufacturing bevel gears which will have all of the advantages of the method of my earlier application referred to, but which will permit of employing a simpler and less costly form of cutting tool.

Another object of the invention is to provide a method of cutting gears having all the advantages of my described prior process, but in which a given cutter may be used to cut a considerable range of work.

A still further object of the invention is to provide a method of cutting gears which will permit of simultaneously roughing and finish-cutting in two adjacent tooth spaces of a gear blank and which will, therefore, be even faster than any heretofore employed, but which will nevertheless permit of using relatively simple cutting tools.

Other objects of the invention will be apparent hereinafter from the specification and from the recital of the appended claims.

With the present invention, the tooth spaces of a gear are cut, as in my earlier process, by rotating a disc-type cutter in engagement with a gear blank while simultaneously feeding the cutter relatively across the face of the blank, but a cutter is employed whose finishing cutting blades have corresponding side cutting edges of identical profile curvature. Preferably the cutter used has side cutting edges of circular arcuate profile and, for cutting bevel gears, a cutter is used that has the centers of curvature of the profiles of successive blades displaced from one another. When such a cutter is rotated in engagement with a tapered gear blank and simultaneously fed lengthwise of the blank, successive blades will cut a bevel gear tooth having the desired change in shape from its large to its small end.

As in the method of my prior application, No. 164,340, the cutter employed in the process of the present invention may have its cutting blades arranged only part way around its periphery with a gap between the last and first blades and the blades may be all roughing blades, or all finishing blades, or part roughing and part finishing blades. Thus it is possible to rough-cut, finish-cut, or to both rough-cut and finish-cut a tooth space of a gear blank in a single revolution of the cutter. The cutter is rotated in engagement with the gear blank and simultaneously moved lengthwise of a tooth space of the blank, and the blank is held stationary during cutting, and indexed when the gap in the cutter is abreast of the cutter.

The cutter used with the present method may have the centers of profile curvature of the cutting edges of successive blades displaced from one another either at a uniform or at a non-uniform rate. When a cutter is used that has the centers of profile curvature of successive cutting edges uniformly displaced from one another, the lengthwise variation in profile curvature of the teeth of the bevel gear may be obtained by varying the rate of feed of the cutter across the face of the gear blank during the cutting of each tooth space. When the cutter used has non-uniform displacement of the profile centers of successive blades, the desired variation in profile curvature of the gear teeth can be obtained by feeding the cutter at a uniform rate along the length of the gear teeth as the cutter rotates in engagement with the blank. By varying the rate of feed, however, in either form of cutter, a single cutter can be used to cut different bevel gears.

For gears of coarse pitch, it is preferred to use separate cutters for roughing and finishing, but both operations may be carried on simultaneously. Thus, a pair of cutters may be employed, one a standard stocking cutter for roughing out the tooth slot, and the other a finishing cutter, such as previously described, for finishing the previously roughened out tooth slot. The two cutters may be mounted coaxially to operate in adjoining tooth spaces and both may be fed simultaneously together across the face of the blank while being rotated in engagement with the blank.

Bevel gears cut according to the present invention will have inherently a desirable localization of tooth bearing or contact, but the amount of localization of bearing may readily be modified by applying the principles of my prior Patent No. 1,733,326 of October 29, 1929, in the cutting of the gears.

Several different embodiments of the invention are illustrated in the accompanying drawings in which.

In any bevel gear it is desirable to have the teeth and the tooth spaces taper in depth and width from their outer to their inner ends so that the teeth of the gear may be of substantially uniform strength throughout their length. The method of the present invention permits of making bevel gears which have these desirable characteristics. The principles on which this invention rests will now be discussed.

In Figs. 3 to 6 inclusive, 20 denotes a bevel pinion cut by the process of the present invention. The axis of this pinion is designated at 22 and its apex at 25. As will be seen clearly in Fig. 6, the teeth 21 of this pinion decrease in depth from their outer to their inner ends and, as will be seen from comparison of Fig. 4 with Fig. 3, the teeth and the tooth spaces of this pinion decrease in width from their outer to their inner ends and the profile shape of the teeth also changes correspondingly from end to end. The sides of the teeth at the small end are more curved than at the large end.

Figures 2, 5:
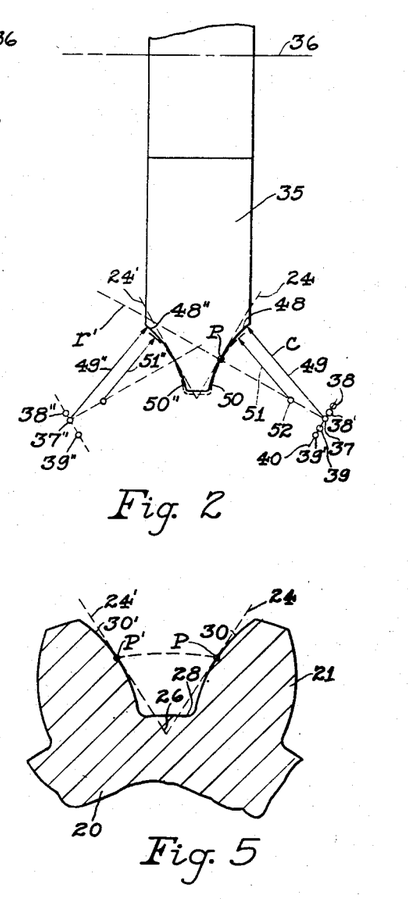
Fig. 5 is a fragmentary sectional view of the gear on a somewhat enlarged scale taken on the line 5—5 of Fig. 6 and illustrating diagrammatically certain principles underlying the present invention.
Figure 6:
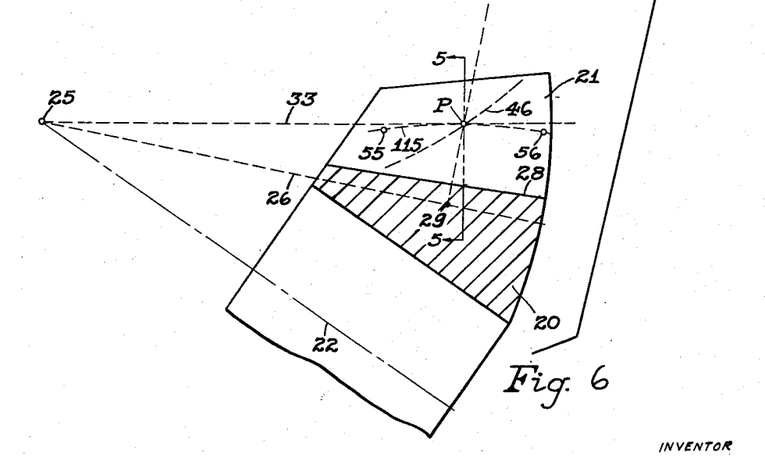
Fig. 6 is a fragmentary axial sectional view of a bevel pinion made according to this invention, further illustrating diagrammatically certain principles of the present invention.

In Figs. 5 and 6 the points P and P' are mean points in the opposite sides of a tooth space of the pinion 20. The planes 24 and 24' are tangent, respectively, to the opposite sides of this tooth space at these mean points P and P'. As will be obvious, if the teeth and tooth spaces of this pinion are to taper in width and height from end to end, the planes 24 and 24' must pass through the apex 25 of the pinion and intersect in a line 26 which also passes through this apex 25.

Disregarding, at first, the bottom 28 of the tooth space, it will readily be seen that the V-shaped profile formed by the tangential planes 24 and 24' could be swept out with a milling cutter having a V-shaped cutting profile, by feeding that milling cutter in the direction of the line 26. The tooth bottom 28, which is inclined to the line of feed 26, can then be cut by making the cutting teeth of the cutter, which are to cut at the small end of the tooth space, suitably higher than those which are adapted to cut at the large end of the tooth space. The tip cutting edges of the cutter should be accordingly arranged in a spiral conjugate to the straight bottom 28 of the tooth space. This spiral will be an involute on cutters which are fed across the face of the blank at a uniform rate.

Now the tooth space which is to be produced on the pinion 20 does not have a V-shaped profile, such as is formed by the tangential planes 24 and 24', but it is formed by opposite side tooth surfaces 30 and 30' which are of convex profile and the profile curvature of these tooth surfaces varies, moreover, from end to end. To produce the desired convex tooth profiles 30 and 30', a cutter is employed that has concave side cutting edges. If these cutting profiles were arranged at a constant radial distance from the cutter axis, as on conventional milling cutters, then the tooth surfaces produced would have straight line elements parallel to the line of feed 26. What I desire to produce, however, is a bevel pinion 20 having tooth surfaces with substantially straight line elements 33 that extend through the cone apex 25 of the gear. This can be obtained by using a cutter in which the centers of curvature of the opposite side cutting edges of successive blades are displaced from one another in the direction of the tangents 24 and 24' (Fig. 2).

Figure 1:
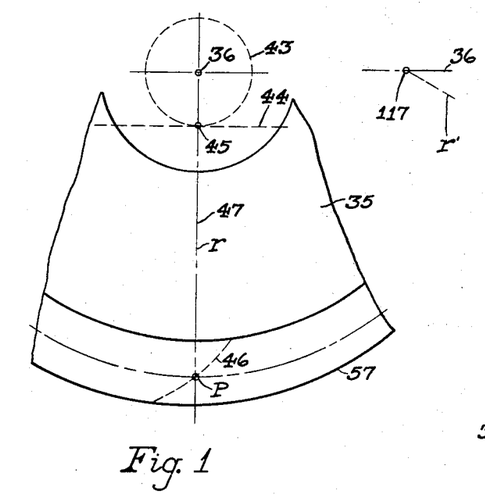
Fig. 1 is a fragmentary diagrammatic elevational view and Fig. 2 is a fragmentary diagrammatic sectional view showing one form of cutter which may be employed in practicing the present invention.

Referring now to Figs. 1 and 2, it will be seen that here is shown diagrammatically a cutter which has corresponding side-cutting edges that are of identical curvature and that have their centers of curvature displaced from one another in the direction of the tangents 24 and 24'. The axis of this cutter is denoted at 36. 37 is the center of the profile of the cutting edge of that blade of the cutter which is to cut at the mean point P in the pinion tooth surface 30. 38 and 39 are the centers of curvature of the cutting edges of blades which are spaced from the mean blade angularly about the periphery of the cutter at points suitable to cut at the large and at the small ends of the tooth surface 30, respectively. The centers 38 and 39 are displaced equidistantly from the center 37 along a line 40 which is parallel to the tangent plane 24. When a cutter is employed in which the cutting profile centers 38, 37, 39, etc., are displaced uniformly from one another, as illustrated, tooth surfaces will be produced on the pinion which will contact with the tangential plane 24 along a straight line inclined to the direction of feed 26. It will readily be understood, then, that by employing a cutter, which is constructed so that the profile centers of successive blades are displaced at a suitable rate from one another, any desired straight line of contact between the cutter and the tooth surface being cut may be arrived at, such as the line 33 (Fig. 6) which extends to the pinion apex 25.

With a cutter such as described up to this point, however, we still would only get tooth surfaces of substantially constant profile shape along the length of the gear tooth. What we want to obtain, however, are gear profiles on the gear teeth which are increasingly curved from the large to the small ends of the teeth.

In the cutting of the gear according to this invention, as already described, the cutter rotates on its axis and is simultaneously moved relatively along the length of the gear tooth space being cut. The relative cutting motion is, then, as if a circle 43 (Figs. 1 and 6) concentric with the cutter axis 36 were rolling on a straight line 44 parallel to the line 26. 45 is the instantaneous axis of this rolling motion. The line of instantaneous contact between the cutter surface and the tooth surface finished thereby is subject to the requirements of gear contact and is a projection of the instantaneous axis to the cutter surface. Point P is a point of this projection and the line of contact is found to be a line 46 inclined to the radial plane 47 of the cutting surface of the cutter.

Inasmuch as the cutting surface of the cutter and the tooth surface being produced thereby contact along the inclined line 46, the profiles of the cutter surface and of the tooth surface in a radial plane 47 of the cutter are bound to differ from one another. A concave circular cutting profile 48 (Fig. 2) having a radius 49 and a center 37 will produce, therefore, a tooth profile 50 which is more curved than the cutting profile 48 and which has a radius 51 and a curvature center 52. The difference in curvature between the cutting surface and the tooth surface, which is to be produced, increases with increasing cutter diameter and also with increasing inclination of the element 33 of the tooth surface to the direction of feed 26.

It is now apparent that a given cutting profile 48 (Fig. 2) will produce increasingly curved tooth profiles the faster its center is displaced along the line 40 parallel to the tangent plane 24 and the more the element 33 of the tooth surface, which is to be produced, is inclined to the direction of feed 26. This is the basis whereby teeth having varying profile curvature from end to end may be cut with a cutter having cutting edges of constant profile curvature.

For cutting gears according to the present invention, then, a cutter will be used in which the centers of curvature of successive cutting edges are displaced at a varying rate, instead of at a uniform rate, along the line 40 parallel to the tooth surface tangent 24. In such a cutter, the center of profile of the cutting edge, which cuts at the small end of the pinion tooth, will be displaced further along the line 40 from the mean center 37 than the center of the profile of the cutting edge which cuts at the large end of the pinion tooth. Thus, instead of having centers of the profiles of the cutting edges, which cut at the small and at the large ends of the tooth, located at 39 and 38, respectively, spaced equidistantly from the mean center 37, a cutter will be employed in which the centers of the cutting edges of these blades, which cut at the small and the large ends of the tooth, respectively, will be at the points 39' and 38', respectively, spaced non-uniformly from the mean center 37.

In Figs. 3 and 4, 41 and 42 denote, respectively, the blades which cut at the large and small ends of the tooth space. The radius of curvature 49 of the side cutting edge 53 (Fig. 3) of the blade 41, which cuts at the large end of the tooth space, is the same as the radius of curvature 49 of the side cutting edge 54 (Fig. 4) which cuts at the small end of the tooth space, and it will be the same as the radius of curvature 49 of the mean cutting edge 48. The centers 38', 37 and 39' of these different cutting edges are displaced, however, from one another at a non-uniform rate in the direction of the tangent 24 as already stated. The centers of curvature of the cutting edges of other blades which cut at other points along the length of the tooth space, are disposed between the extreme positions 39' and 38' and non-uniformly spaced from one another. The centers of the profiles of successive cutting edges of the cutter are arranged, then, on a conical or three-dimensional spiral, coaxial with the axis 36 of the cutter. The lead of this spiral becomes increasingly larger for the cutting edges which are coordinated to the small end of the pinion tooth so that the profile produced at the small end of the pinion tooth may be much more curved than the cutting edge which cuts that end of the tooth. On the other hand, at the large end of the pinion tooth, the tooth profile produced will differ only a little from the cutting edge which cuts at that end of the tooth. The positions of the centers of the cutting profiles of successive cutting edges along the line 40 parallel to the tangent 24 is also reflected in the tooth shape produced by the pinion.

When a cutter, such as has been described, is employed, the line of contact 55—P—56 between the tooth surface and the tangential plane 24 is no longer a straight line but becomes a curve 115 whose concave side faces the tooth bottom 28. The curve is shown exaggerated in the drawings.

What has been said about one side 30 of the pinion teeth applies equally, of course, to the other side of the pinion teeth. Hence, by use of a suitable cutter, both sides of a tooth space of a tapered gear may be cut simultaneously according to the method of the present invention to taper both in depth and width. In Fig. 2, 39", 37", 38" denote, respectively, the centers of profile curvature of the side-cutting edges which are to cut at the small end, center and large end, respectively of the tooth surface 30'. The centers 38", 37" and 39" correspond for one side of the cutter to the centers 38', 37' and 39' for the opposite side of the cutter. Likewise, 49" and 51", respectively, are the radii of curvature of the cutting edge 48" and of the tooth profile 50" cut thereby, corresponding in this respect to the radii 49 and 51, respectively, and the profiles 48 and 50, respectively.

For cutting the pinion 20, then, a cutter will be used, such as shown in Figs. 1 and 2, which has cutting blades, whose top cutting edges are arranged in a spiral 57 about the axis 36 of the cutter, and whose side cutting edges are of uniform circular arcuate curvature but have centers of curvature displaced progressively from one another radially and laterally along a spiral of varying lead. When this cutter is rotated in engagement with the gear blank and simultaneously fed across the face of the blank, it will produce tooth surfaces whose profile curvatures change in the desired fashion from the large to the small ends of the teeth and whose depth varies in the desired fashion from the large to the small ends of the teeth.

Figure 7:
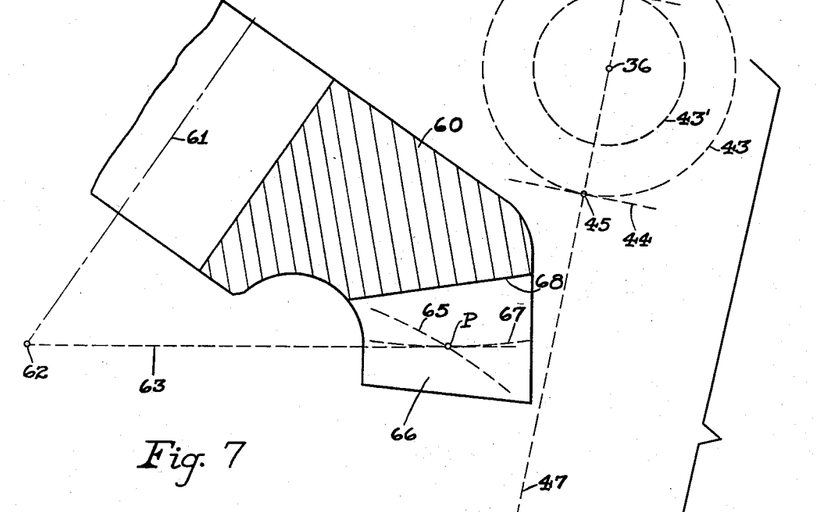
Fig. 7 is a fragmentary axial sectional view of the bevel gear which is to mate with the pinion shown in Fig. 6, and illustrating how the pair may be made conjugate when both members are produced according to the method of the present invention.

The gear 60 (Fig. 7), which is to mate with the pinion 20, may be cut in the same way as the pinion 20. 61 is the axis of this mate gear 60, 62 its apex, and 63 a straight line element of its pitch surface. The line 65 denotes the line of contact between the cutting surface of the cutter, which is used to produce the gear 60, and the tooth surface 66 cut thereby. P is again a mean point of contact between the cutting surface and the tooth surface to be cut, and 67 is the line of contact between the tooth surface and a plane tangent to said surface at said mean point P. This line of contact 67 is again a curved line and faces the bottom 68 of the tooth space. Hence, when a pair of gears 20 and 60, cut according to the method of the present invention, are in mesh, the lines of contact 115 and 67 of the mating tooth surfaces with a common tangent plane will be oppositely disposed with reference to the elements 33 and 63 of those tooth surfaces. As will readily be understood, the result is that the mating tooth surfaces of the gear will not contact along their full length but will have a slight mismatch or relief at the tooth ends. The teeth, however, will be kinematically correct and the mismatch of their tooth surfaces will make the gears capable of a slight amount of adjustment, which is a desirble characteristic. In fact, often more mismatch may be desired at the tooth ends than is obtainable with the method of cutting described. Additional mismatch or localization of bearing may then be obtained by designing the cutters so that they may be fed across the face of the gear blank or blanks in the cutting of one or both members of a gear pair in such a way as to obtain tooth surfaces on the two members of the pair whose line elements are inclined to one another according to the principles laid down in my prior United States Patent No. 1,733,326 to which reference has already been made above.

In the cases described it will be noted that the line of instantaneous contact between the cutting surface of the cutter and a tooth surface finished thereby is inclined to the radial plane of the cutter. The inclination is usually in excess of 30° and it is in the same direction on both sides of a tooth space. The lines of contact on both sides of the gear teeth extend from the bottom of the tooth at the small end thereof toward the top of the tooth at the large end thereof. On gears of standard proportions, the inclination of these lines of instantaneous contact to the radial plane of the cutter is particularly marked on the pinion, because of the long addendum ordinarily used on bevel pinions. On the gear where the tangents to the opposite sides of a tooth space usually include a smaller angle with each other than on the pinion, the line of instantaneous contact is often so much inclined to a radial plane of the cutter that it departs only slightly from the general direction of the tooth surface.

The cut made by each individual cutting edge of a cutter nearly coincides with the line of instantaneous contact, particularly when a large number of cutting edges is provided. In any case, the characteristics stated for the lines of instantaneous contact are true also for the cuts of the individual cutting edges. We may therefore say that the tooth sides of a gear produced according to the present invention are surfaces enveloped by a suitable number of concave cuts, which extend in a general direction from the bottom of the tooth surfaces at the small end upwardly and backwardly toward the large end of the tooth on both sides of a tooth space. It should be noted that the cuts are inclined to the lines of instantaneous gear contact so that smooth tooth action is obtained when a pair of gears, which have been cut according to this invention, are rolled together, even though the number of cutting edges in the cutter be relatively small and the tooth surfaces produced consequently contain cutter marks.

Figure 8:
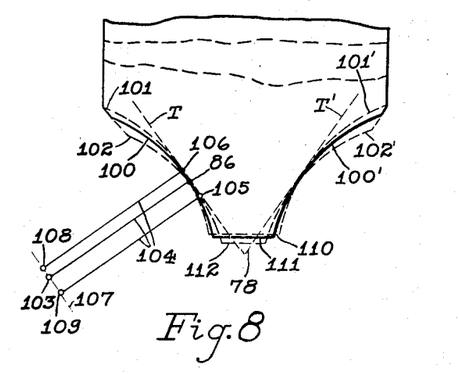
Fig. 8 is a diagrammatic view illustrating on a somewhat enlarged scale the construction of a cutter such as may be employed in the process of the present invention.

Fig. 8 further illustrates diagrammatically the structure of a cutter such as may be employed in the cutting of gears according to the present invention. The cutting surface of the cutter contains a basic V-shaped contour formed by the tangents T and T'. The side cutting edges have a basic circular profile of constant radius. The opposite side cutting edges which operate at a mean point along the length of the tooth space are denoted at 100 and 100', respectively. In the view I have shown superimposed upon these, the cutting edges 101, 101' and 102, 102', respectively, which cut at the large and small ends of the tooth space, respectively. The center of the cutting edge 100 is denoted at 103. The center of the cutting edge 101 is at 108 and the center of the cutting edge 102 is at 109.

The several cutting edges 101, 100 and 102, have, of course, equal radii 104 but the centers 108, 103, 109, respectively, of curvature of these cutting edges are displaced from one another in the direction of the line 107. It will be noted, too, that the heights of the blades vary. This is to obtain the desired taper in depth of the tooth space from one end to the other. Thus the tip of the cutting blade, which cuts at the large end of the tooth space, is denoted at 110, the tip of the blade, which cuts at a mean point along the length of the tooth space, is denoted at 111, and the tip of the blade, which cuts at the small end of the tooth space, is denoted at 112. It will be observed that the blade which cuts at the small end of the tooth space is of greatest height. The tip cutting edges of the blades of the cutter are arranged in a spiral, as already described, which is conjugate to the tooth space bottom which is to be produced.

I have already pointed out that the line of instantaneous contact 46 (Figs. 1 and 6) between the cutter and the tooth surface is oblique because it is the normal projection of instantaneous axis 45 to the cutting surface. While this can be verified with the known methods of descriptive geometry, I shall add nevertheless an analysis which gives closely approximate results more directly.

Figure 9:
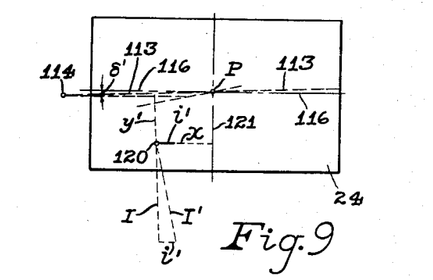
Figs. 9 to 11 inclusive are diagrammatic views further explanatory of the basic principles of the invention.
Figure 10:
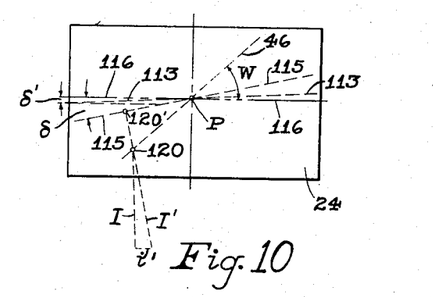
Figure 11:
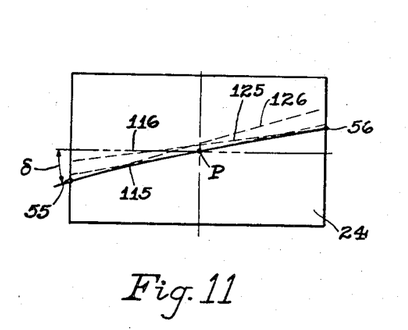

Figs. 9 to 11 inclusive are extremely or infinitely enlarged views of the tangential plane 24 to the tooth surface 21 of the gear 20 at the mean point P. Line 113, extending through points P and 114, is the line in the cutting surface of the cutter which corresponds to line P—55 of the tooth surface (Fig. 6). Line 113 appears as a straight line in the enlargement shown. Line 113 is inclined to the peripheral direction, that is, to a line normal to the cutter radius, at the lead angle $\delta'$ in the conical surface of the basic cutting profile 24. (Fig. 5.) Lead angle $\delta'$ is related to the inclination $\delta$ of the line 115 (Figs. 6 and 13) with respect to the line 116, which is also the direction of feed. $\delta$ is measured in the tangential plane.

With $r$ equal to radial distance 36—P (Fig. 1) and $c$ equal to distance 36—45, I obtain in known manner:

$$r \tan \delta' = c \tan \delta$$

$$\tan \delta' = \frac{c}{r} \tan \delta$$

The cutting surface in the immediate vicinity of the point P can be described by bodily moving the radial cutting profile of the cutter along the line 113 while at the same time moving it slightly along 24 (Fig. 5) so that the profile point at line 113 remains continuously in contact with the conical cutting surface described by the profile tangent. In other words, the ordinate $z$ of any point of the cutting surface above the tangential plane can be considered as composed of the ordinates of the cylindrical surface described by moving the radial cutting profile along tangent 113 and of the ordinates of the conical surface described by the profile tangent 24 when rotated about the cutter axis. The resulting ordinate is the difference between the two individual ordinates.

In our present second-order approximation, the conical surface of tangent 24 departs from the tangential plane at P like a cylindrical surface having the same straight line element at P and the same normal radius $r'$ (Fig. 2) as readily understood. The normal radius $r'$ is the distance P—117 (Fig. 2) of the point P from the cutter axis measured along the normal to the cutting surface. 117 is the point of intersection of the normal with the cutter axis 36.

What is true of the ordinates $z$ is also true of their derivatives, that is, of the inclination of the normals to the cutter surface. These surface normals may be plotted as vectors and geometrically added as such.

Take a point 120 (Fig. 9) having a distance $x$ from the line 121 and a distance $y'$ from the line 113. The normal at 120 to the conical or cylindrical surface extending along the line 121 is inclined at an angle whose tangent:

$$i' = \frac{x}{r'}$$

is in a direction parallel to line 116 and perpendicular to line 121.

Let C denote the radius of the profile of the cutting surface in a radial plane of the cutter, that is, substantially the radius of the side cutting edges of the cutter, that is, the distance 49 (Fig. 2). Let R equal the curvature radius of the produced tooth surface in a normal section passing through the mean point P and the perpendicular to its line of contact 115 (Fig. 6) with the tangential plane at P.

The radius of the cylindrical surface extending along the line 113 is then $$C \cos^2 \delta'$$

and the normal at point 120 is inclined in a direction perpendicular to line 113 at an angle whose tangent is $$I = \frac{y'}{C \cos^2 \delta'}$$

and $$y' = (y - x \tan \delta') \cos \delta'$$

where $y$ is the ordinate of the point 120 with reference to line 116 and $x$ is the abscissa.

Through transformation, $$I \cdot \cos \delta' = \frac{y'}{C \cos \delta'} = \frac{y - x \tan \delta'}{C}$$

This gives the vector ordinate. The vector abscissa is equal to $$I \cdot \sin \delta' + i' = \left(\frac{y - x \tan \delta'}{C}\right) \tan \delta' + \frac{x}{r'}$$

The vector components, when geometrically added, give a resultant I', see Fig. 9, which describes the direction and inclination of the surface normal at point 120.

At the line of contact 46 (Figs. 2, 6 and 10), the normals of the cutter surface and the produced tooth surface coincide. Accordingly both the direction and amount of inclination of the normals must be the same on both the cutting surface and on the tooth surface produced.

Hence: the ratio of the vector abscissa to the vector ordinate is equal to $$\tan \delta' + \frac{x}{r'} \cdot \frac{C}{y - x \tan \delta'}$$ and to $\tan \delta$ $$(\tan \delta - \tan \delta')(y - x \tan \delta') = \frac{x}{r'} \cdot C$$

$$(\tan \delta - \tan \delta')\left(\frac{y}{x} - \tan \delta'\right) = \frac{C}{r'}$$

$$\frac{y}{x} = \tan w$$

where $w$ is the angle between the line of contact 46 and the line of feed 116.

$$(\tan \delta - \tan \delta')(\tan w - \tan \delta') = \frac{C}{r'}$$

$$\tan w = \tan \delta' + \frac{C}{r'(\tan \delta - \tan \delta')} \quad (2)$$

The vector ordinate or ordinate component of the inclination of the normal of the produced tooth surface is $$(y - x \tan \delta) \frac{\cos^2 \delta}{R}$$

It must be equal to the ordinate component given above, that is, equal to $$\frac{y - x \tan \delta'}{C} = (y - x \tan \delta) \frac{\cos^2 \delta}{R}$$

and $$\frac{\left(\frac{y}{x} - \tan \delta'\right)}{C} = \frac{\tan w - \tan \delta'}{C} = (\tan w - \tan \delta) \frac{\cos^2 \delta}{R}$$

From Equation (2) we have $$\tan w - \tan \delta' = \frac{C}{r'(\tan \delta - \tan \delta')}$$

Hence:

$$\frac{C}{r'(\tan \delta - \tan \delta') C} = \frac{\cos^2 \delta}{R} \frac{C}{r'(\tan \delta - \tan \delta')} - (\tan \delta - \tan \delta')$$

$$\frac{R}{\cos^2 \delta} = C - r'(\tan \delta - \tan \delta')^2 \quad (3)$$

$$\frac{R}{\cos^2 \delta} = C - r' \tan^2 \delta \left(1 - \frac{c}{r}\right)^2 \quad (3a)$$

$$\frac{R}{\cos^2 \delta} = C - r' \tan^2 \delta' \left(\frac{r}{c} - 1\right)^2 \quad (3b)$$

$$\frac{R}{\cos^2 \delta}$$

is here the radius of curvature of the gear tooth profile in a section perpendicular to the direction of feed, that is, in the same section in which the radius C, equal to 49 (Fig. 2), is taken.

It is known how $$\frac{R}{\cos^2 \delta}$$

the radius of profile curvature, should change along the teeth of a bevel gear. Accordingly, we determine first the normal radius $r'$ and the rate of feed of the cutter along the length of the gear tooth $$\frac{c}{r}$$

from the normal requirements, and then change $\tan \delta$ along the gear tooth just enough to obtain the desired different profile radii at various points along the tooth.

The above Formula (3) therefore enables us to arrive at the rate of change of $\tan \delta$ and therefore at the required curvature of the line 115.

At the mean point P (Fig. 11) we provide an inclination $\delta$ as arrived at from the requirements of tooth design and lengthwise mismatch of the tooth surfaces of mating gears. At point 56 (Figs. 6 and 11) nearer to the large end of the tooth, we provide a smaller inclination of the tangent 125 so that the tooth profile curvature differs less from the curvature of the cutting edge which produces the same. At point 55 nearer to the small end of the gear tooth, the inclination of the tangent 126 is made larger than the inclination of the mean tangent 113 so that the tooth profile produced is more curved than the cutting edge which produces the same.

Figure 3:
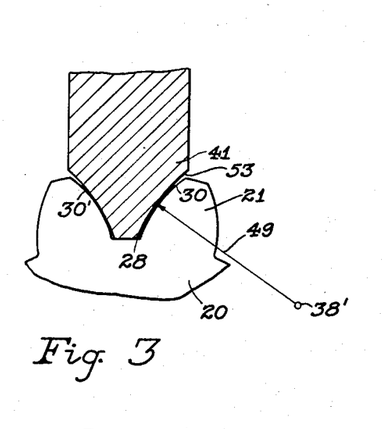
Fig. 3 is a diagrammatic view showing this cutter in the operation of cutting at the large end of a tooth space of a tapered gear.
Figure 4:
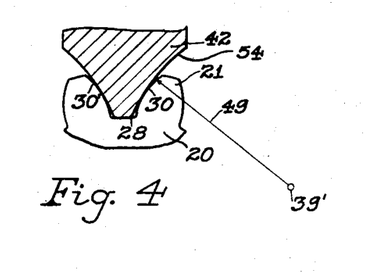
Fig. 4 is a diagrammatic view showing this cutter in the operation of cutting at the small end of the tooth space of this tapered gear.

In the embodiment of Figs. 1 to 3 inclusive, a profile curvature radius $$\frac{R}{\cos^2 \delta}$$

in direct proportion to the cone distance is desired. With $A \cos \delta$ equal to the distance 29—25 measured along the direction of feed 26 (Fig. 6), the desired change at an abscissa $x$ of point 120' (Fig. 10) from mean point P is $$\frac{x}{A \cos \delta} \cdot \frac{R}{\cos^2 \delta}$$

where $\delta$ is the inclination at the mean point P.

According to Formula (3a), the change in $$\frac{R}{\cos^2 \delta}$$

is $$r' \left(1 - \frac{c}{r}\right)^2 \cdot x \cdot \frac{d(\tan^2 \delta)}{dx}$$

Then $$\tan \delta = \frac{dy}{dx}$$

$$\frac{d(\tan^2 \delta)}{dx} = 2 \tan \delta \frac{d^2 y}{dx^2}$$

Accordingly, $$r' \left(1 - \frac{c}{r}\right)^2 \cdot 2 \tan \delta \frac{d^2 y}{dx^2} = \frac{R}{\cos^2 \delta (A \cos \delta)}$$

$$\frac{d^2 y}{dx^2} = \frac{R}{(\cos^3 \delta) r' \left(1 - \frac{c}{r}\right)^2 \cdot 2A \sin \delta}$$

The radius of curvature of the line 115 may readily be determined from the above term $$\frac{d^2 y}{dx^2}$$

and ordinarily will be found to be so large as to be hardly noticeable to the eye.

It has been assumed above that the feed is in a direction as though the circle 43 (Fig. 6) were rolling upon a straight line 44. This means that the work is fed with the cut for finishing. However, it is also possible to have the feed take place in the opposite direction for finishing. The relative motion then is as if the circle 43' were rolling on the straight line 44'. In this case the radius 36—130 of the rolling circle 43' should be introduced as a negative quantity in the above formulas. In both cases, the feed illustrated by the rolling circles 43 and 43', respectively, is uniform, that is, in direct proportion to the cutter rotation.

It is within the contemplation of the invention, however, to employ a non-uniform feed, also, where desirable. In this case the lead of the circular cutting profiles along the tangent 24 (Fig. 2) may be made uniform, that is, the centers of curvature of equi-spaced blades of the cutter may be also equally spaced from one another as indicated at 36, 37 and 39. In other words, we can achieve the same results, with a varying feed rate and a cutter whose successive cutting edges have their centers of curvature displaced uniformly from one another, as we can obtain from a constant feed rate and a cutter whose successive cutting edges have their centers of curvature displaced at a varying rate from one another. The reason is apparent from Formula (3b). Where the rate of displacement of the centers of successive cutting edges of the cutter is uniform, tan δ' is constant, but c is variable. c may therefore be determined for various points along the tooth to give the desired profile radius. The feed rate required varies like c along the tooth as will be readily understood.

A further embodiment of the invention resides in the combination of the two modifications already described. The cutter may have cutting edges the centers of curvature of which are displaced at a changing rate from one another and such a cutter may be fed along the gear tooth being cut at a variable feed rate. This embodiment of the invention has the advantage that the range of a given cutter is increased so that the same cutter may be used for cutting a wide variety of gears. However, either of the two embodiments of the invention first described have considerable range of use, for a given cutter may be made to cut gears of different tooth conformation simply by changing the rate of feed of the cutter along the tooth.

Because of the possibility of varying the rate of feed of the cutter as it moves along the gear tooth, the invention may be employed with distinct advantage also in the cutting of cylindrical gears such as spur and helical gears, because with the cutter and the method of the present invention it is possible to obtain any desired amount of localization of tooth bearing on such gears.

The cutter used for spur gears may have the centers of the corresponding side-cutting edges of successive blades arranged on a spiral of uniform lead. Such a cutter will sweep out a cylindrical surface which is inclined to the pitch surface of the spur gear being cut. By using the principles of my prior patent above mentioned, then, a pair of spur gears may be cut which will mesh with localized tooth bearing.

The feed along the teeth of tapered gears during the finishing cut is considerably longer than the face width of the gear being cut. This is due to the long, smooth finishing cuts taken by the cutter as it rotates on its axis and moves along the length of the gear tooth. The length of the feed movement during the finishing operation is at least 50% greater than the face width of the gear. The length of the finishing cut has the advantage of equalizing the stresses during different phases of the individual cuts and provides higher accuracy and improved finish on the tooth surface being produced.

The preferred method of cutting gears according to this invention by successive roughing and finishing cuts will now be described in more detail. This method broadly may be applied in the use of any disc-type rotary cutter which is constructed to perform a single revolution per feed cycle. Thus this method is applicable also to the cutters described in my pending application No. 164,340 above mentioned.

Figure 12:
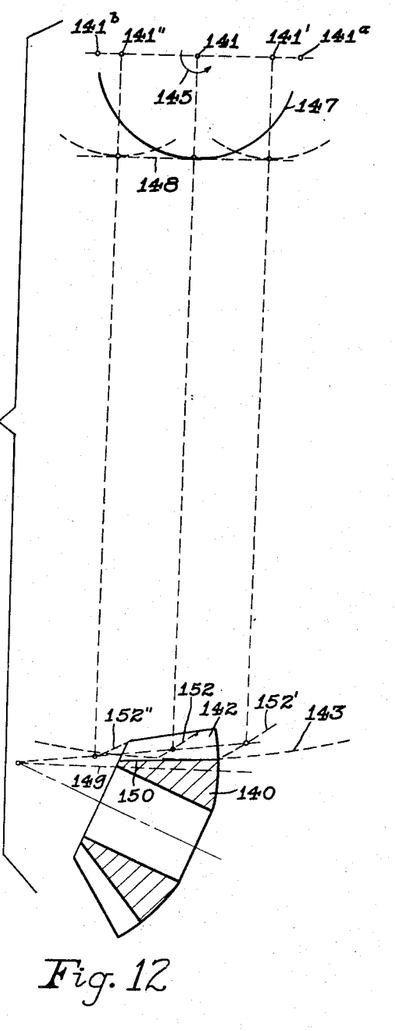
Fig. 12 is a diagrammatic view showing a bevel pinion in section and illustrating diagrammatically the motions employed in the cutting of the same according to the present invention.

In Fig. 12, 140 denotes a bevel gear or pinion which is to be cut. 141 is the center or axis of the cutter, which is employed in the cutting of this gear, when the cutter is operating at a mean point along the length of a tooth 142 of the gear. The dotted line 143 denotes the spiral tip surface of the cutter when its center is at the mean position 141. The cutter is assumed to be turning continuously in the direction of the arrow 145 during the cutting operation and in the finishing operation such relative feed movement is produced between the cutter and the gear blank as if the circle 147 circumscribed about the axis 141 of the cutter were rolling on a line 148 which is parallel to the direction of feed 149 and inclined slightly to the bottom 150 of the tooth space being cut. For the cutting operation, the gear blank 140 is adjusted to an angle with respect to the direction 149 of feed smaller than its root angle.

152 denotes the line of instantaneous contact between the cutter surface and the finished tooth surface of the gear in the mean position. To completely finish the tooth surface, the finishing cut is started with the cutter positioned so that its center is at 141' and the cutter is fed across the face of the blank as it rotates on its axis, until its axis reaches the position 141". The lines of contact 152' and 152", respectively, which correspond to the cutter axis positions 141' and 141", respectively, just reach the tooth surface 142 at opposite ends thereof. In actual practice, it is necessary to feed the cutter at both ends far enough to permit reversal of the direction of feed without shock. In the extreme positions of feed movement of the cutter, then, the cutter centers would attain positions such as 141a and 141b to permit of finishing between positions 141' and 141" at a uniform rate of feed.

The cutter may be made to finish cut only. In this case, it would have no rough-cutting edges and in this case the return feed from the position 141b to the starting position 141a may be effected very rapidly. The indexing of the gear may be performed during this return movement while the gap in the cutter is abreast of the gear blank. Preferably, however, the cutter is provided with roughing as well as finishing blades so that it may successively rough and finish cut a tooth space in a single revolution. The roughing operation is then preferably partly or wholly performed during feed of the cutter from a position 141b to the position 141a and the finishing cut takes place during return movement from the position 141a to the position 141b. The gear is indexed, as before, when the gap in the cutter is abreast of the gear blank. In either case, when the cutter has made as many revolutions as there are tooth spaces in the blank to be cut, the gear will be finished.

Figure 14:
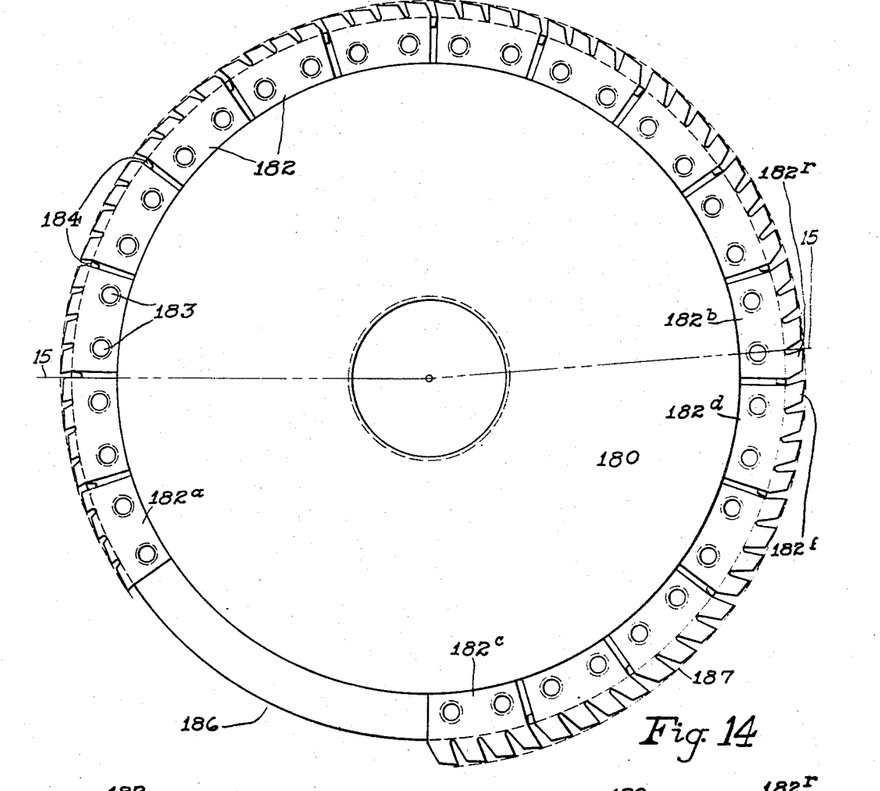
Fig. 14 is a side elevation of a cutter such as may be employed in cutting gears according to the method of the present invention.
Figure 15:
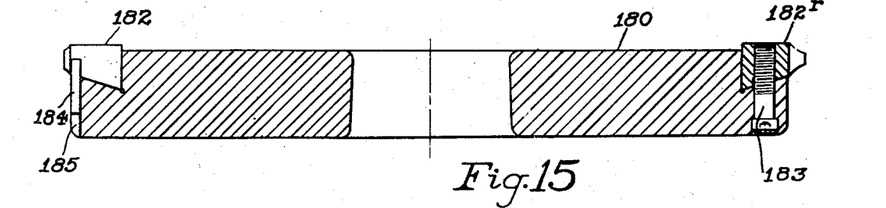
Fig. 15 is a sectional view of this cutter taken on the line 15—15 of Fig. 14.

In Figs. 14 and 15, I have shown a cutter made according to a preferred embodiment of the invention for rough and finish cutting a tooth slot in a single revolution of the cutter in accordance with the principles of the invention. The cutter comprises a rotary head 180 and a plurality of cutting segments 182 which are secured to the head by screws 183. Keys 184 which engage in spaced slots 185 in the head and seat against the backs of the cutting segments serve to position the segments angularly about the axis of the head. In the embodiment shown, each of the segments is provided with four integral cutting blades or teeth which are relieved on their side and top faces. These cutting blades or teeth may be sharpened to have cutting edges at both sides or alternate blades may have opposite side cutting edges. The first segment is denoted at 182a and the last segment at 182c.

There is a peripheral gap 186 between the last segment 182c and the first segment 182a which is of sufficient angular extent to permit of indexing the gear blank when this gap is abreast of the blank in the rotation of the cutter. The segments beginning with the segment 182a and including the segment denoted at 182b are provided with roughing blades or teeth, while the segments 182d to 182c inclusive are provided with finishing blades or teeth. The finishing blades have side cutting edges of constant profile curvature according to the principles already given, the centers of the cutting edges of successive blades being disposed at progressively different distances from the axis of the cutter. The finishing blades are also of progressively varying height and their top cutting edges are accordingly arranged in a spiral, such as indicated at 187, in accordance with the principles hereinbefore set forth.

Figure 16:
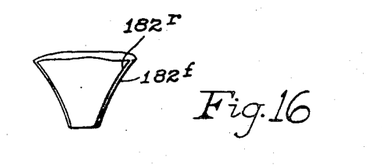
Fig. 16 is a diagrammatic view showing one of the roughing blades of this cutter superimposed upon a finishing blade.

The roughing blades are preferably arranged like a circular broach, that is, they are preferably made of progressively increasing height to the height of the tooth space of the gear to be cut as a limit. The roughing blades may be and preferably are made with side cutting edges of circular arcuate curvature and preferably the centers of curvature of corresponding successive side-cutting edges of the roughing blades are progressively displaced from one another in a manner similar to the displacement of the centers of curvature of the side-cutting edges of the finishing blades. Thus, the roughing and finishing blades can be relief-ground in one continuous operation. Each roughing blade is, however, made of less thickness than the finishing blade which cuts at a corresponding point along the length of the tooth space of the gear. Thus stock will be left on the sides of the tooth space, after the roughing cut, to be finished in the finishing feed movement. Thus, as illustrated in Fig. 16, the roughing blade 182r which cuts at the large end of the tooth space is narrower than the finishing blade 182f which cuts at this same end of the tooth space.

In producing a tooth space of the gear blank, the cutter is adjusted into engagement with the blank so that it will cut to the full depth of the tooth spaces of the blank without any feed in the direction of tooth depth. The roughing cut begins with the cutter center at 141b and during the time the first few roughing blades are taking their cuts, there need not be any lengthwise feed movement of the cutter. The line 160 (Fig. 13) denotes the path of the first roughing blade of the cutter. After the roughing cuts have reached the point 161 of the tooth at the small end thereof, the feed movement may begin. At the point where the roughing cuts have reached full height, the feed of the cutter will have progressed to a point where its center is at 141 or to a point where its center is between the positions 141 and 141b.

Figure 13:
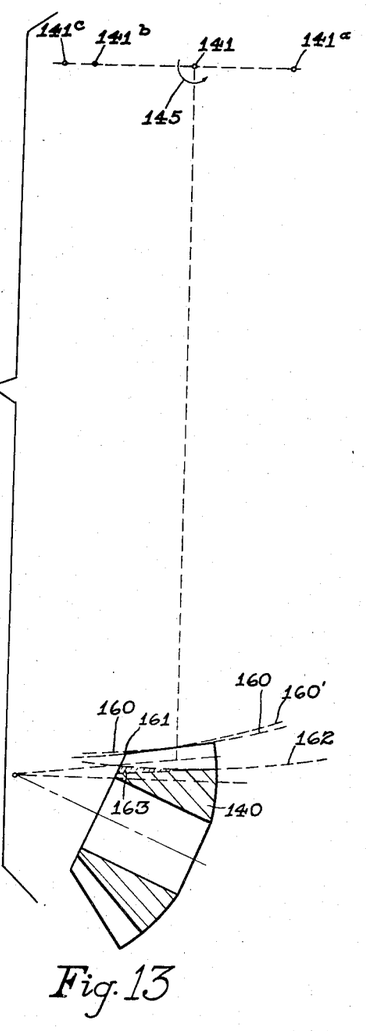
Fig. 13 is another sectional view of this pinion, illustrating diagrammatically the type of chips cut by a cutter in the process of the present invention.

162 denotes the path of the cutting blade at the end of depth roughing when the cutter center is at 141. From this point on, only the lower part of the sides of the tooth at the large end of the tooth space need to be roughed out. There is, therefore, only a moderate amount of stock required to be removed in the further roughing operation and therefore the rate of feed of the cutter may be accelerated to the point of reversal 141a. In the latter part of this roughing feed, the rate of feed movement may be even greater than the finishing feed. The finishing operation takes place, as already described, on the reverse movement while the cutter is being fed from 141a to 141b. The stock, which has been left on the bottom of the sides of the tooth space at the small end thereof and which is denoted by the shaded area 163 in Fig. 13, is removed during the finishing feed movement and the removal of this slight amount of stock helps to balance the cutting load of the last finishing blade.

It is to be noted that with the cutter and method described, the total roughing cuts are included between the lines 160 and 162 which diverge from the small to the large ends of the tooth space. Likewise, successive roughing cuts diverge from the small to the large end of the tooth space so that the chips cut by the successive roughing blades are each of increasing thickness from the small to the large end of the tooth. Inasmuch as the cutter rotation is in the direction of the arrow 145, it will be seen, then, that the roughing cut starts at the small end of the tooth, that is, at the sides of reduced chip thickness. This is of advantage since it adds much to the life of the roughing blade, for the life of any cutting blade is determined largely by the thickness of the chip which it has to take at the beginning of its cut. I have therefore devised a broaching operation for roughing tapered gears in which the stock is removed in tapered chips. The increase in chip thickness from the small to the large end of the tooth is usually between 40% and 70% of the chip thickness at the small end and the roughing chip extends practically for the whole length of the teeth. In development, the chips are of trapezoidal shape with the shorter side of the trapezoid at the start of the cut. This is precisely what is desired in preference to zero chip thickness at the start of the cut. It is readily seen that the above roughing method is bound to be very efficient in view of the long broaching cuts and tapering chip thicknesses.

If desired, the roughing cut may start with the cutter axis in a position 141c. The path of the first roughing blade will then be the line 160'. It will be seen that this reduces the total chip thickness at the small end of the tooth, which is the starting point of the chip, still further. Starting of the roughing cut with the tool center at some position such as 141c or even to the left of 141c is especially desirable if a tool is employed that has only roughing blades. In this case, the end position of depth roughing is to the left of the point 141. In other words, full cutting depth is obtained before the cutter center has reached position 141.

As in my prior application, it will be noted that the finishing cuts in the preferred direction of feed are along lines which extend from the top of the teeth at the large end toward the bottom at the small end. This long finishing contact makes for smooth and accurate finishing cuts. This same inclined finishing contact is also obtained in the cutting of helical gears but in the case of these gears, the lines of finishing contact are oppositely inclined on opposite sides of the gear teeth.

In Figs. 17 to 20 inclusive, I have illustrated a modification of the invention which may be employed where a smoother or faster roughing cut is desired. This modification of the invention may be employed in the cutting of all kinds of gears, but is here shown as applied to bevel gears. Here a pair of disc cutters are employed. One of them is a pure roughing cutter, constructed simply to remove stock. The other is a combination roughing and finishing cutter, which is made according to the principles of this invention as already described, and which is intended to finish the tooth slots previously roughed out by the other cutter.

Figure 17:
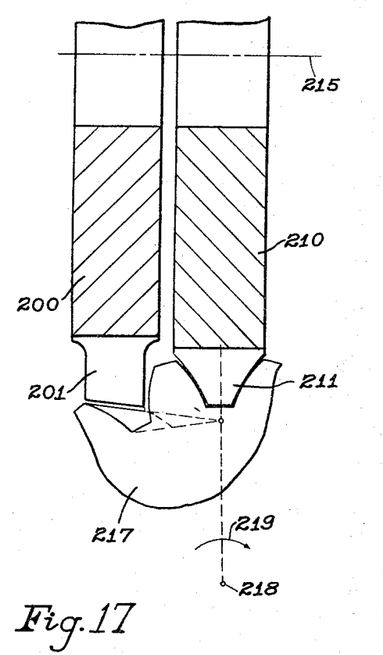
Fig. 17 is a fragmentary diagrammatic view showing how separate roughing and finishing cutters may be employed simultaneously in a modification of the present invention to rough and finish-cut simultaneously separate tooth slots of a gear blank.

The roughing cutter is denoted at 200. It may be of any suitable construction. In the embodiment shown, it is in the form of a slotting tool having a plurality of slotting blades or teeth arranged part-way only around its periphery. The blades of this cutter are preferably made of progressively increasing height to cut deeper and deeper into the blank to the full height of a tooth space as a limit.

Figure 19:
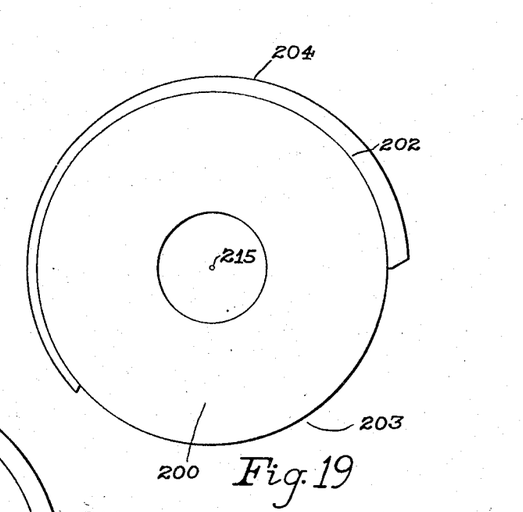
Figs. 19 and 20 are diagrammatic side elevational views, respectively, of the roughing and finishing cutters shown in Fig. 17, and further illustrating the construction of these tools.

The slotting blades or teeth may be made in known manner, as illustrated. They are widest at their tips and have their opposite sides converging inwardly from their tips so as to clear the sides of the tooth slot being cut. One of the blades is shown in the sectional view of Fig. 17 and is denoted at 201. Fig. 19, which is a diagrammatic side elevational view of the slotting cutter, indicates how the blades increase progressively in height around the periphery of the cutter. The cutting portion of the cutter is denoted at 202. As is seen, the tip surfaces of the blades lie in a spiral 204 and there is a gap 203 between the last and first blades.

The cutter 210, which does the finishing, is made according to the principles previously described, and, like the cutters previously described, contains preferably both roughing and finishing blades. It may be of the same general construction as any of the cutters previously described. The blades are arranged only part-way around the periphery of the cutter and preferably are made of progressively increasing height. In the diagrammatic view of Fig. 20, 212 denotes the cutting portion of the cutter and 214 denotes the spiral surface in which the tips of the roughing and finishing blades lie. There is a gap 213 between the last finishing and the first roughing blades of the cutter to permit of indexing. This cutter has curved side-cutting edges determined in accordance with the principles of the invention already set forth. One of the blades is shown in the sectional view at 211 in Fig. 17.

Figure 20:
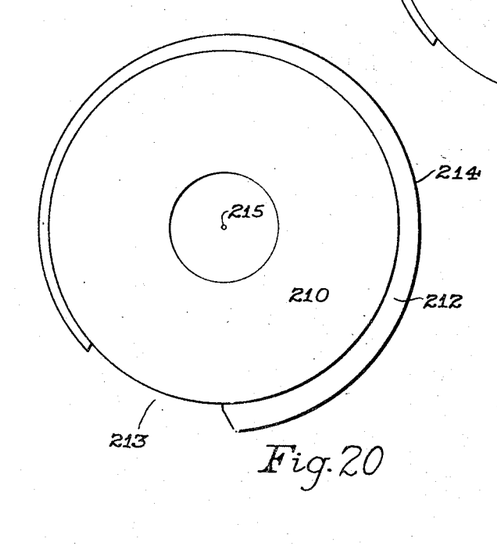

As will be noted from comparison of Figs. 19 and 20, the cutting portion 202 of the roughing cutter 200 occupies a smaller part of the periphery of that cutter than does the cutting portion 212 of the periphery of the cutter 210. This is because the slotting cutter 200 is preferably made so that none of its blades will be cutting while the finishing blades of the cutter 210 are in operation. With this construction, the final accuracy and the final finish of the tooth surfaces produced upon a gear being cut, are dependent solely upon the finishing blades of the cutter 210 and are not affected in any way by the slotting cutter 200.

In use, the two cutters 200 and 210 are rigidly connected to one another to rotate about a common axis 215, and they are spaced so that they will operate in adjacent tooth spaces of the gear 217 which is to be cut. The cutter 210 is positioned so that it will be radial of the gear axis 218. The cutters are rotated in engagement with the gear blank while the blank is held stationary on its axis and, as the cutters rotate in engagement with the blank, they are fed first in one direction and then in the other across the face of the blank. During feed of the cutters in one direction, the cutter 200 slots out a tooth space of the gear blank and the cutter 210 completes the roughing of a tooth slot which has previously been operated upon by the cutter 200. During this feed movement, all the blades of the slotting cutter and all of the roughing blades of the cutter 210 will have taken their cuts. On the reverse feed movement, the gap 203 in the slotting cutter will be abreast of the gear blank and the finishing blades of the cutter 210 only will be in operation and will finish-cut the tooth space of the blank previously operated upon by the roughing blades of this cutter. When the gap 213 in this cutter comes abreast of the blank, the blank may be indexed. The gap 203 in the cutter 200 is long enough to register with the gap 213 also. The indexing movement is in the direction of the arrow 219 (Fig. 17).

Figure 18:
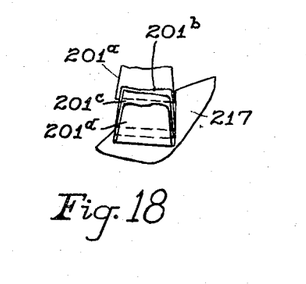
Fig. 18 is a diagrammatic view illustrating the structure and operation of the roughing cutter shown in Fig. 17.

The operation of the slotting tool is clearly illustrated in Fig. 18. Here a plurality of blades 201a, 201b, 201c and 201d are shown. The blade 201a is one of the first blades to come into operation. The blade 201d is one of the last. The blades are preferably of increasing height as indicated by the blades 201b, 201c and 201d. It will be noted that it is only the tip cutting edges of the blades which cut. The sides of the blades are inclined away from the sides of the tooth space and do no cutting. It is not necessary, therefore, to relieve them. The slotting cutter is, therefore, a very inexpensive tool and adds very little to the total cost of the tool mechanism. At the same time, however, the operation of cutting a gear blank can be speeded up considerably where two cutters, such as shown, are employed or a smoother tooth surface finish and longer cutter life can be obtained.

In Fig. 17, the use of the two cutters is shown as applied to the cutting of a bevel gear blank. For cutting a spur gear blank, the principle is the same but the slotting cutter may be designed to reach further down into the tooth spaces of the blank and remove more stock. This is because the tooth spaces of a spur gear are of uniform width from end to end and their sides do not converge like the sides of tooth spaces of a bevel gear.

While several different embodiments of the invention have been illustrated and described, it will be understood that the invention is capable of various further modifications and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of producing a gear which comprises positioning a disc milling cutter, that has a plurality of radially disposed cutting blades whose corresponding side cutting edges have uniform profile curvature but varying inclination to a plane of rotation perpendicular to the axis of the cutter, in engagement with a gear blank, and cutting each tooth of the blank by rotating said cutter on its axis while producing a relative feed movement at a varying velocity between the cutter and blank longitudinally of the tooth in time with the cutter rotation so that successive blades of the cutter cut at progressively different points from one end of the tooth to the other during a revolution of the cutter, and indexing the blank periodically.

2. The method of producing a gear which comprises positioning a disc milling cutter, that has a plurality of radially disposed cutting blades whose corresponding side cutting edges have uniform profile curvature but varying inclination to a plane of rotation perpendicular to the axis of the cutter and which are arranged part way around its periphery with a gap between the last and the first blades, in engagement with a gear blank, and cutting each tooth of the blank by rotating said cutter on its axis while holding the blank stationary and while producing a relative feed movement between the cutter and blank longitudinally of the tooth in time with the cutter rotation so that successive blades of the cutter cut at progressively different points from one end of the tooth to the other during a revolution of the cutter, and indexing the blank when the gap in the cutter is abreast of the blank.

3. The method of producing a gear which comprises positioning a disc milling cutter, that has a plurality of radially disposed cutting blades whose corresponding side cutting edges have uniform profile curvature and which are arranged part way only around its periphery with a gap between the last and the first blades, in engagement with a gear blank, and cutting the tooth spaces of the blank by rotating said cutter on its axis while holding the blank stationary and while producing a relative feed movement at a varying velocity between the cutter and blank longitudinally of the tooth space in time with the cutter rotation so that successive blades of the cutter cut at progressively different points from one end of the tooth space to the other during the relative feed movement, and indexing the blank when the gap in the cutter is abreast of the blank.

4. The method of producing a gear which comprises positioning a disc milling cutter, that has a plurality of radially disposed cutting blades which are of progressively varying height and whose corresponding side cutting edges have uniform profile curvature, in engagement with a gear blank, and cutting each tooth space of the blank by rotating said cutter on its axis while producing a relative feed movement between the cutter and blank longitudinally of a tooth space in time with the cutter rotation and in a direction inclined to the root surface of the tooth space so that successive blades of the cutter cut at progressively different points from one end of the tooth space to the other during the feed movement, and indexing the blank periodically.

5. The method of producing a gear which comprises positioning a disc milling cutter that has a plurality of radially disposed cutting blades which are of progressively varying height and whose corresponding side cutting edges have uniform profile curvature, in engagement with a gear blank, and cutting each tooth space of the blank by rotating said cutter on its axis while producing a relative feed movement between the cutter and blank longitudinally of the tooth space at a varying velocity in a direction inclined to the root surface of the tooth space and in time with the cutter rotation so that successive blades of the cutter cut at progressively different points from one end of the tooth space to the other during the feed movement, and indexing the blank periodically.

6. The method of producing a gear which comprises positioning a disc milling cutter, that has a plurality of radially disposed cutting blades which are of progressively varying height and whose corresponding side cutting edges have uniform profile curvature and which are arranged part way only around its periphery with a gap between the last and first blades, in engagement with a gear blank, and cutting each tooth space of the blank by rotating said cutter on its axis while holding the blank stationary and while producing a relative feed movement between the cutter and blank longitudinally of the tooth space and in a direction inclined to the root line of the tooth space in time with the cutter rotation so that successive blades of the cutter cut at progressively different points from one end of the tooth space to the other during the feed movement, and indexing the blank when the gap of the cutter is abreast of the blank.

7. The method of producing a gear which comprises positioning a disc milling cutter, that has a plurality of radially disposed cutting blades which are of progressively varying height and whose corresponding side cutting edges have uniform profile curvature and which are arranged part way only around its periphery with a gap between the last and first blades, in engagement with a gear blank, and cutting each tooth space of the blank by rotating said cutter on its axis while holding the blank stationary and while producing a relative feed movement at a varying velocity between the cutter and blank longitudinally of the tooth space and in a direction inclined to the root line of the tooth space in time with the cutter rotation so that successive blades of the cutter cut at progressively different points from one end of the tooth space to the other during the feed movement, and indexing the blank when the gap in the cutter is abreast of the blank.

8. The method of producing a gear which comprises positioning a disc milling cutter, which has a plurality of radially disposed cutting blades whose corresponding side cutting edges are of identical profile curvature but are progressively displaced radially and axially of the cutter from one another, in engagement with a gear blank, and cutting the tooth spaces of the blank by rotating said cutter on its axis while holding the blank stationary on its axis and while producing a relative feed movement between the cutter and blank across the face of the blank in such timed relation to the cutter rotation that successive blades of the cutter cut at progressively different points from one end of the tooth space to the other during the feed movement, and indexing the blank periodically.

9. The method of producing a gear which comprises positioning a disc milling cutter, which has a plurality of radially disposed cutting blades whose corresponding side cutting edges are of identical profile curvature but are progressively displaced radially and axially of the cutter from one another, in engagement with a gear blank, and cutting each tooth space of the blank by rotating said cutter on its axis while holding the blank stationary on its axis and while producing a relative feed movement between the cutter and blank at a varying velocity across the face of the blank in such timed relation to the cutter rotation that successive blades of the cutter cut at progressively different points from one end of the tooth space to the other during the feed movement, and indexing the blank periodically.

10. The method of producing a gear which comprises positioning a disc milling cutter, which has a plurality of radially disposed cutting blades whose corresponding side cutting edges are of identical profile curvature but are progressively displaced radially and axially of the cutter from one another, in engagement with a gear blank, and cutting each tooth space of the blank by rotating said cutter on its axis while holding the blank stationary on its axis and while producing a relative feed movement between the cutter and blank at a uniform velocity across the face of the blank in such timed relation to the cutter rotation that successive blades of the cutter cut at progressively different points from one end of the tooth space to the other during the feed movement, and indexing the blank periodically.

11. The method of producing a gear which comprises positioning a disc milling cutter, which has a plurality of radially disposed cutting blades whose corresponding side cutting edges are of identical circular arcuate profile curvature but which have their centers of curvature progressively displaced radially and axially of the cutter from one another, in engagement with a gear blank, and cutting each tooth space of the gear by rotating said cutter on its axis while holding the blank stationary on its axis and while producing a relative feed movement between the cutter and blank across the face of the blank in such timed relation to the cutter rotation that successive blades of the cutter cut at progressively different points from one end of the tooth space to the other during the feed movement, and indexing the blank periodically.

12. The method of producing a gear which comprises positioning a disc milling cutter, which has a plurality of radially disposed cutting blades whose corresponding side cutting edges are of identical circular arcuate profile curvature and which have their centers of curvature displaced from one another radially and axially of the cutter, in engagement with a gear blank, and cutting each tooth space of the blank by rotating said cutter on its axis while holding the blank stationary on its axis and while producing a relative movement between the cutter and blank at a varying velocity across the face of the blank in such timed relation to the cutter rotation that successive blades of the cutter cut at progressively different points from one end of the tooth space to the other during the feed movement, and indexing the blank periodically.

13. The method of producing a gear which comprises positioning a disc milling cutter, which has a plurality of radially disposed cutting blades whose corresponding side cutting edges are of identical circular arcuate profile curvature and which have their centers of curvature displaced from one another radially and axially of the cutter, in engagement with a gear blank, and cutting each tooth space of the blank by rotating said cutter on its axis while holding the blank stationary on its axis and while producing a relative feed movement at a uniform velocity between the cutter and blank across the face of the blank in such timed relation to the cutter rotation that successive blades of the cutter cut at progressively different points from one end of the tooth space to the other during the feed movement, and indexing the blank periodically.

14. The method of producing a gear which comprises positioning a disc milling cutter, which has a plurality of radially disposed cutting blades whose corresponding side cutting edges are of identical concave circular arcuate profile curvature but which have their centers of curvature progressively displaced from one another uniform amounts radially and axially of the cutter, in engagement with a gear blank, and cutting each tooth space of the blank by rotating said cutter on its axis while holding the blank stationary on its axis and while producing a relative feed movement between the cutter and blank at a varying velocity across the face of the blank in such timed relation to the cutter rotation that successive blades of the cutter cut at progressively different points from one end of the tooth space to the other during the feed movement, and indexing the blank periodically.

15. The method of producing a gear which comprises positioning a disc milling cutter, which has a plurality of radially disposed cutting blades whose corresponding side cutting edges are of identical concave circular arcuate profile curvature but have their centers of curvature progressively displaced varying amounts from one another radially and axially of the cutter, in engagement with a gear blank, and cutting each tooth space of the blank by rotating said cutter on its axis while holding the blank stationary on its axis and while producing a relative feed movement at a uniform velocity between the cutter and blank across the face of the blank in such timed relation to the cutter rotation that successive blades of the cutter cut at progressively different points from one end of the tooth space to the other during the feed movement, and indexing the blank periodically.

16. The method of producing a gear which comprises positioning a disc milling cutter, which has a plurality of radially disposed cutting blades whose corresponding side cutting edges are of identical concave circular arcuate profile curvature but have their centers of curvature progressively displaced from one another varying amounts radially and axially of the cutter, in engagement with a gear blank, and cutting each tooth space of the blank while rotating said cutter on its axis and while producing a relative feed movement at a varying velocity between the cutter and blank across the face of the blank in such timed relation to the cutter rotation that successive blades of the cutter cut at progressively different points from one end of the tooth space to the other during the feed movement, and indexing the blank periodically.

17. The method of cutting a tapered gear which comprises positioning a rotary disc gear cutter, which has a plurality of radially disposed cutting blades whose corresponding side-cutting edges are of identical concave circular arcuate profile curvature but have their centers of curvature progressively displaced from one another, in engagement with a tapered gear blank, and cutting each tooth space of the blank by rotating said cutter on its axis while producing a relative feed movement between the cutter and blank longitudinally of the tooth space in the direction of the root line of the tooth space, and indexing the blank periodically.

18. The method of cutting a gear which comprises positioning a rotary disc cutter, that has a plurality of cutting blades of concave profile shape arranged part way only around its periphery with a gap between the last and first blades, in engagement with a gear blank and cutting each tooth space of the blank by rotating said cutter on its axis while producing a relative feed movement between the cutter and blank across the face of the blank at a varying velocity in time with the cutter rotation so that successive blades of the cutter cut at progressively different points from one end of the tooth space to the other, and indexing the blank when the gap in the cutter is abreast of the blank.

19. The method of cutting a gear which comprises employing a pair of coaxially mounted disc cutters, each of which has a plurality of cutting blades arranged part way around its periphery with a gap between the last and first blades, one of the cutters having roughing blades only and the other cutter having both roughing and finishing blades, and the roughing cutter having a gap of sufficient angular extent to register simultaneously with both the finishing blades of the finishing cutter and the gap in said cutter, positioning said cutters in engagement with a gear blank so that they will operate simultaneously in two adjacent tooth spaces of the blank, and rotating said cutters in engagement with the blank while producing a relative feed movement between the cutters and blank across the face of the blank in time with the rotation of the cutters, and indexing the blank when the gaps in the two cutters are abreast of the blank.

20. The method of cutting a tapered gear which comprises positioning a rotary cutter, which has a plurality of radially disposed cutting blades of progressively varying height arranged around its periphery, in engagement with a tapered gear blank, and cutting each tooth space of the blank by rotating said cutter on its axis while producing a relative feed movement between the cutter and blank longitudinally of the tooth space in such timed relation to the cutter rotation that the successive blades of the cutter cut progressively from one end of the tooth space to the other and the blade which is of smaller height cuts at the large end of the tooth space, and indexing the blank periodically.

21. The method of cutting a gear which comprises positioning a rotary cutter, which has a plurality of radially disposed cutting blades of progressively varying height whose corresponding side cutting edges are of constant profile curvature but are progressively displaced relative to one another laterally and radially of the axis of the cutter, in engagement with a gear blank, and cutting each tooth space of the blank by rotating said cutter on its axis while producing a relative feed movement between the cutter and blank longitudinally of the tooth space in such timed relation to the cutter rotation that the blades of smallest height cut at the large end of the tooth space and succeeding blades cut progressively along the length of the tooth space toward the small end thereof, and indexing the blank periodically.

22. The method of cutting a tapered gear which comprises positioning a rotary cutter, that has a plurality of radially disposed cutting blades whose corresponding side cutting edges are of constant profile curvature but are progressively displaced relative to one another at a uniform rate both laterally and radially of the cutter axis, in engagement with a gear blank, and cutting each tooth space of the blank by rotating said cutter on its axis while producing the relative feed movement between the cutter and blank longitudinally of the tooth space in such timed relation to the cutter rotation that the cutting edge of the cutter which is the least displaced from the cutter axis cuts at the large end of the tooth space and the cutting edges of successive blades cut progressively along the length of the tooth space toward the small end thereof during the feed movement, and indexing the blank periodically.

23. The method of cutting a tapered gear which comprises positioning a rotary cutter, that has a plurality of radially disposed cutting blades whose corresponding side cutting edges are of constant profile curvature but are progressively displaced relative to one anther at a non-uniform rate both radially and axially of the cutter axis, in engagement with a tapered gear blank, and cutting each tooth space of the blank by rotating the cutter on its axis while producing a relative feed movement between the cutter and blank longitudinally of the tooth space in such timed relation to the cutter rotation that the cutting edge which is least displaced frim the cutter axis cuts at the large end of the tooth space and successive cutting edges cut progressively along the length of the tooth space to the small end thereof, and indexing the blank periodically.

24. The method of cutting a tapered gear which comprises positioning a rotary cutter, that has a plurality of radially disposed cutting blades of progressively varying height whose corresponding side cutting edges are of constant profile curvature but are progressively displaced from one another at a uniform rate laterally and radially of the cutter axis, in engagement with a tapered gear blank and cutting each tooth space of the blank by rotating said cutter on its axis while producing a relative feed movement at a varying rate between the cutter and blank longitudinally of the tooth space in time with the cutter rotation and in a direction inclined to the root line of the tooth space, and indexing the blank periodically.

25. The method of cutting a tapered gear which comprises positioning a rotary cutter, that has a plurality of radially disposed cutting blades of progressively varying height whose corresponding side cutting edges are of constant profile curvature but are progressively displaced relative to one another at a non-uniform rate both laterally and radially of the cutter axis, in engagement with a tapered gear blank, and rotating said cutter on its axis while producing a relative feed movement at a uniform rate between the cutter and blank longitudinally of the tooth space in time with the cutter rotation and in a direction inclined to the root line of the tooth space, and dexing the blank periodically.

26. The method of cutting a tapered gear which comprises positioning a rotary cutter, which has a plurality of radially disposed cutting blades of progressively varying height whose corresponding side cutting edges are of constant profile curvature but are progressively displaced relative to one another at a non-uniform rate both laterally and radially of the cutter axis, in engagement with a tapered gear blank, and cutting each tooth space of the blank by rotating said cutter on its axis while producing a relative feed movement between the cutter and blank at a non-uniform rate longitudinally of the tooth space in time with the cutter rotation and in a direction inclined to the root line of the tooth space, and indexing the blank periodically.

27. The method of cutting a tapered gear which comprises positioning a rotary cutter, that has a plurality of radially disposed blades whose corresponding side cutting edges are of circular arcuate profile shape and have equal radii of curvature but have their centers of curvature arranged about the axis of the cutter on a three-dimensional spiral of increasing lead, in engagement with a tapered gear blank, and cutting each tooth space of the blank by rotating said cutter on its axis while producing a relative feed movement between the cutter and blank longitudinally of the tooth space in such timed relation with the cutter rotation that the side cutting edge, whose center is on the part of the spiral which is of smallest lead, cuts at the large end of the tooth space and successive cutting edges cut progressively along the length of the tooth space toward the small end thereof, and indexing the blank periodically.

28. The method of cutting a tapered gear which comprises positioning a rotary cutter, that has a plurality of radially disposed roughing blades of progressively increasing height followed by a plurality of radially disposed finishing blades of progressively increasing height, in engagement with a gear blank, and cutting each tooth space of the blank by rotating said cutter on its axis while simultaneously producing a relative feed movement between the cutter and blank across the face of the blank which is in one direction while the roughing blades are cutting and in the opposite direction while the finishing blades are cutting, the rotation of the cutter being so coordinated to the relative feed movement that the finishing blade which is of greatest height cuts at the small end of the tooth space of the blank, and indexing the blank periodically.

29. The method of cutting a gear which comprises employing a rotary disc cutter that has a plurality of radially arranged cutting blades whose opposite side-cutting edges are symmetrically disposed with reference to a plane of rotation perpendicular to the axis of the cutter and whose corresponding side-cutting edges have the same concave profile shape but have profiles progressively displaced relative to one another at a uniform rate laterally and radially of the cutter axis, and rotating said cutter in engagement with a gear blank while holding the blank stationary on its axis and while producing a relative reciprocatory feed movement at a varying velocity between the cutter and blank across the face of the blank in time with the cutter rotation so that the cutter makes one revolution for each feed reciprocation, and periodically indexing the blank.

30. The method of cutting a gear which comprises employing a rotary disc cutter that has a plurality of radially arranged cutting blades whose opposite side-cutting edges are symmetrically disposed with reference to a plane of rotation perpendicular to the axis of the cutter and whose corresponding side-cutting edges have the same concave profile shape but have profiles progressively displaced relative to one another at a varying rate laterally and radially of the cutter axis, and rotating said cutter in engagement with a gear blank while holding the blank stationary on its axis and while producing a relative reciprocatory feed movement at a uniform velocity between the cutter and blank across the face of the blank in time with the cutter rotation so that the cutter makes a revolution for each feed reciprocation, and periodically indexing the blank.

31. The method of cutting a gear which comprises employing a rotary disc cutter that has a plurality of radially arranged cutting blades whose opposite side-cutting edges are symmetrically disposed with reference to a plane of rotation perpendicular to the axis of the cutter and whose corresponding side-cutting edges have the same concave profile shape but have profiles progressively displaced relative to one another at a varying rate laterally and radially of the cutter axis, and rotating said cutter in engagement with a gear blank while holding the blank stationary on its axis and while producing a relative reciprocatory feed movement at a varying velocity between the cutter and blank across the face of the blank in time with the cutter rotation so that the cutter makes a revolution for each feed reciprocation, and periodically indexing the blank.

32. The method of cutting a gear which comprises employing a rotary disc cutter that has a plurality of radially arranged cutting blades which are of progressively varying height, whose opposite side-cutting edges are symmetrically disposed with reference to a plane of rotation perpendicular to the axis of the cutter and whose corresponding side-cutting edges have the same concave profile shape but have profiles progressively displaced relative to one another at a uniform rate laterally and radially of the cutter axis, and rotating said cutter in engagement with a gear blank while holding the blank stationary on its axis and while producing a relative reciprocatory feed movement at a varying velocity between the cutter and blank across the face of the blank in a direction inclined to the root surface of the blank in time with the cutter rotation, so that the cutter makes a revolution for each feed reciprocation, and periodically indexing the blank.

33. The method of cutting a gear which comprises employing a rotary disc cutter that has a plurality of radially arranged cutting blades which are of progressively varying height, whose opposite side cutting edges are symmetrically disposed with reference to a plane of rotation perpendicular to the axis of the cutter and whose corresponding side-cutting edges have the same concave profile shape but have profiles progressively displaced relative to one another at a varying rate laterally and radially of the cutter axis, and rotating said cutter in engagement with a gear blank while holding the blank stationary on its axis and while producing a relative reciprocatory feed movement at a uniform velocity between the cutter and blank across the face of the blank in a direction inclined to the root surface of the blank in time with the cutter rotation so that the cutter makes a revolution for each feed reciprocation, and periodically indexing the blank.

34. The method of cutting a gear which comprises employing a rotary disc cutter that has a plurality of radially arranged cutting blades which are of progressively varying height, whose opposite side cutting edges are symmetrically disposed with reference to a plane of rotation perpendicular to the axis of the cutter and whose corresponding side-cutting edges have the same concave profile shape but have profiles progressively displaced relative to one another at a varying rate laterally and radially of the cutter axis, and rotating said cutter in engagement with a gear blank while holding the blank stationary on its axis and while producing a relative reciprocatory feed movement at a varying velocity between the cutter and blank across the face of the blank in a direction inclined to the root surface of the blank in time with the cutter rotation so that the cutter makes a revolution for each feed reciprocation, and periodically indexing the blank.

35. The method of producing a gear which comprises employing a rotary disc cutter that has a plurality of radially arranged cutting blades which are of progressively varying height, whose opposite side-cutting edges are symmetrically disposed with reference to a plane of rotation perpendicular to the axis of the cutter and whose corresponding side-cutting edges are of identical concave circular arcuate profile curvature but have their centers of curvature progressively displaced from one another uniform amounts radially and axially of the cutter, and cutting each tooth space of the blank by rotating said cutter in engagement with the blank while holding the blank stationary on its axis and while producing a relative reciprocatory feed movement between the cutter and blank at a varying velocity across the face of the blank in a direction inclined to the root surface of the tooth space in such timed relation to the cutter rotation that successive blades of the cutter cut at progressively different points from one end of the tooth space to the other during the feed movement, and periodically indexing the blank.

36. The method of producing a gear which comprises employing a rotary disc cutter that has a plurality of radially arranged cutting blades which are of progressively varying height, whose opposite side-cutting edges are symmetrically disposed with reference to a plane of rotation perpendicular to the axis of the cutter and whose corresponding side-cutting edges are of identical concave circular arcuate profile curvature but have their centers of curvature progressively displaced varying amounts from one another radially and axially of the cutter, and cutting each tooth space of the blank by rotating said cutter in engagement with the blank while holding the blank stationary on its axis and while producing a relative feed movement at a uniform velocity between the cutter and blank across the face of the blank in a direction inclined to the root line of the tooth space and in such timed relation to the cutter rotation that successive blades of the cutter cut at progressively different points from one end of the tooth space to the other during the feed movement, and indexing the blank periodically.

37. The method of producing a gear which comprises positioning a rotary disc cutter that has a plurality of radially disposed cutting blades which are of progressively varying height, whose opposite side-cutting edges are symmetrically disposed with reference to a plane of rotation perpendicular to the axis of the cutter and whose corresponding side-cutting edges are of identical concave circular arcuate profile curvature but have their centers of curvature progressively displaced from one another varying amounts radially and axially of the cutter, and cutting each tooth space of the gear blank by rotating said cutter in engagement with the blank while holding the blank stationary on its axis and while producing a relative feed movement at a varying velocity between the cutter and blank across the face of the blank in a direction inclined to the root surface of the tooth space and in such timed relation to the cutter rotation that successive blades of the cutter cut at progressively different points from one end of the tooth space to the other during the feed movement, and indexing the blank periodically.

ERNEST WILDHABER.